March 14, 1950     G. O. HOFFSTETTER     2,500,681
LATERAL SPREADER
Filed July 29, 1946     2 Sheets-Sheet 1
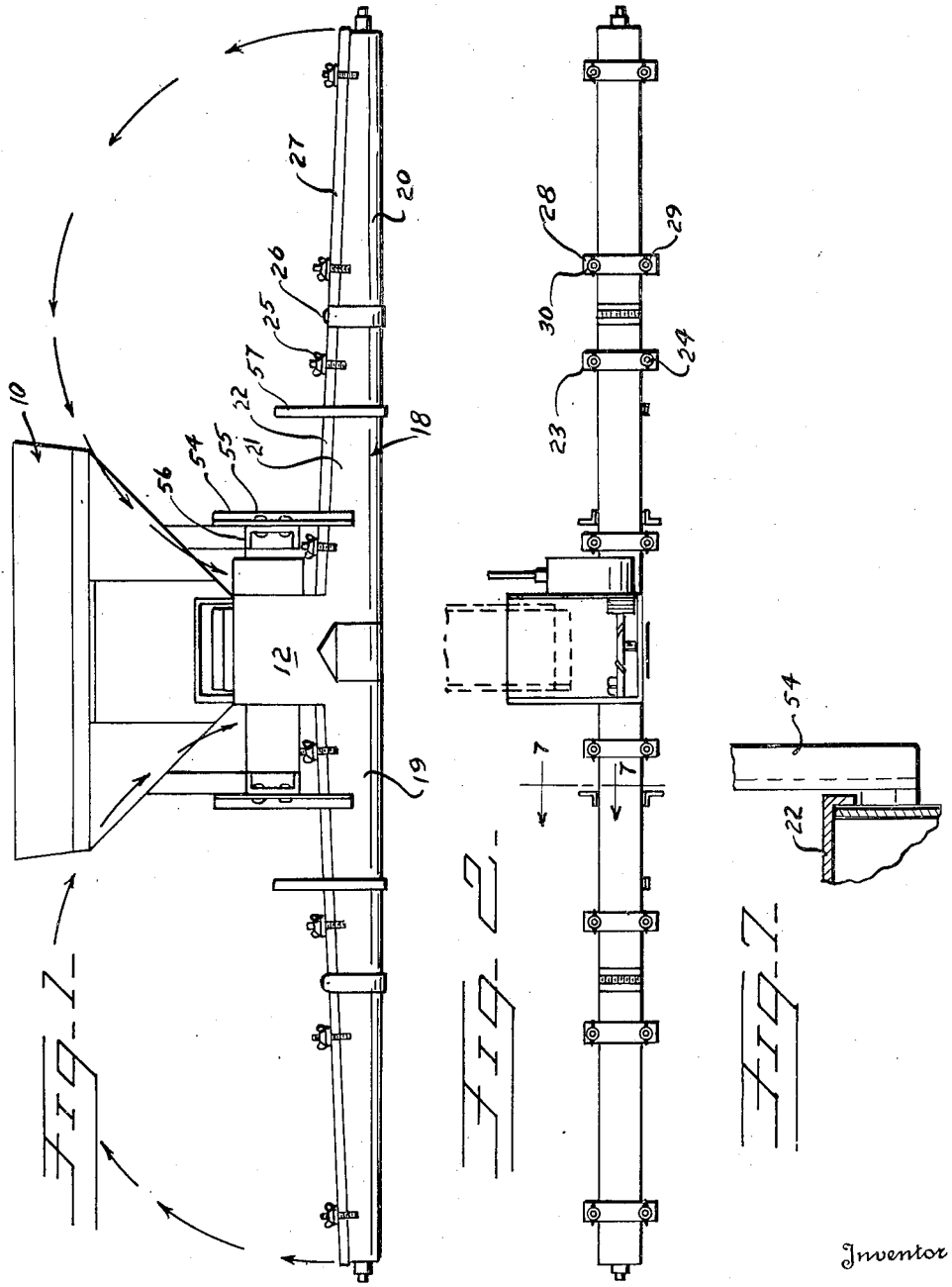
Inventor
G. O. Hoffstetter
By Kimmel & Crowell
Attorneys

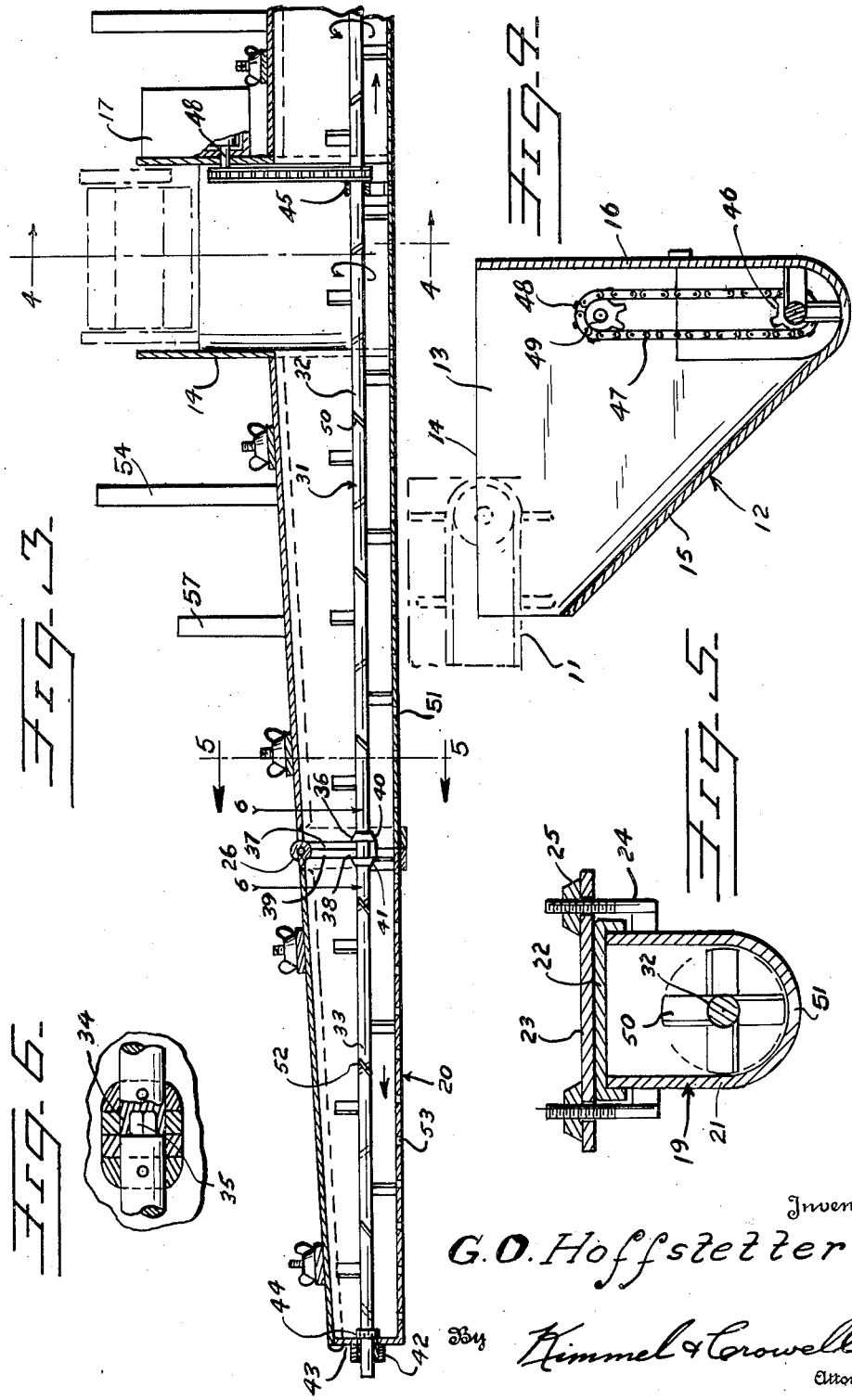

Patented Mar. 14, 1950

2,500,681

UNITED STATES PATENT OFFICE 2,500,681

LATERAL SPREADER

George O. Hoffstetter, Jerseyville, Ill.

Application July 29, 1946, Serial No. 686,923

2 Claims. (Cl. 275—2)

This invention relates to fertilizer spreaders for mounting on the rear of a hopper.

An object of this invention is to provide a fertilizer spreader which is adapted to spread the material in a fixed path.

Another object of this invention is to provide a spreader in the form of an elongated housing mounted transversely at the rear of a hopper, the housing having discharge openings therein, and also including a conveying means for conveying and agitating the material.

A further object of this invention is to provide a spreader of this kind which is formed with foldable outer ends so that the elongated housing may be collapsed in order that the truck on which the hopper is mounted may be moved over normal roads.

A further object of this invention is to provide in combination with a hopper and a conveyor in the bottom of the hopper for discharging the material from the hopper, a lateral conveyor and spreader receiving the material from the first conveyor and discharging the material onto the ground.

With the above and other objects in view, my invention consists in the arrangement, combination and details of construction disclosed in the drawings and specification, and then more particularly pointed out in the appended claims.

In the drawings,

Figure 1 is a detail rear elevation of a hopper having a fertilizer spreader constructed according to an embodiment of this invention mounted thereon, Figure 2 is a plan view of the spreader, Figure 3 is a fragmentary longitudinal section of a spreader, Figure 4 is a sectional view taken on the line 4—4 of Figure 3, Figure 5 is a sectional view taken on the line 5—5 of Figure 3, Figure 6 is a fragmentary sectional view taken on the line 6—6 of Figure 3, Figure 7 is a fragmentary sectional view taken on the line 7—7 of Figure 2.

Referring to the drawings, the numeral 10 designates generally a hopper which has mounted in the lower portion thereof an endless conveyor 11. The conveyor 11 discharges the material from the inclined bottom of the hopper 10 to the rear of the hopper, and the discharged material from the conveyor 11 enters a receiver generally designated as 12. The receiver 12 is open at the top 13 thereof, and is formed of opposite side walls 14, a downwardly and rearwardly inclining bottom wall 15, and a vertical rear wall 16.

The hopper 10 has associated with the conveyor 11 thereof a gear box 17 which is adapted, as will be hereinafter described, to provide driving means for the laterally distributing conveyor. The receiver 12 has secured thereto a housing generally designated as 18 which includes an inner housing or section 19 which tapers outwardly from the receiver 12 and the outer housing sections 20 which taper on the same angle as the inner section 19. The inner housing section 19 comprises a substantially U-shaped member 21 which is open at the top and the top of the U-shaped member 21 is closed by a flanged cover 22.

The cover 22 is detachably secured on the top of the body 21 by means of transversely extending clamping plates 23 through which engage upstanding bolts 24, which are fixed at the lower ends to the sides of the U-shaped member 21. Wing nuts 25 are threaded on the bolts 24 and when in applied position will firmly clamp the cover or closure 22 over the open top of the U-shaped member 21.

The outer sections 20 are hingedly secured, as at 26, to the outer ends of the inner sections 19. These outer sections 20 are also U-shaped in transverse section and the tops thereof are closed by elongated flanged covers 27 which are held in applied position by means of clamping plates or bars 28. The bolts 29 are fixed to the sides of the outer sections 20, extending through the clamping plates or bars 28 and wing nuts 30 are threaded onto the bolts 29.

The housing 18 has disposed lengthwise thereof an elongated combined conveyor and agitator shaft generally designated as 31. The shaft 31 includes an inner shaft member 32 which extends throughout the length of the inner section 19. The outer sections 20 have journaled therein outer shaft members 33 which are adapted to be coupled to the inner shaft member 32 by detachable coupling means, including a socket 34 carried by the outer end of the inner shaft section 32, and a splined stud 35 carried by the inner end of the outer shaft section 33.

The outer end of the inner shaft section 32 is journaled through bearing 36 carried by a supporting bar 37, and the inner end of the outer shaft section 33 is journaled in a bearing 38 carried by a supporting bar 39.

A collar 40 is secured to the inner shaft member 32 and bears against the inner side of the bearing 36. A collar 41 is fixed on the inner end of the outer shaft member 33 and bears against the bearing 38. The outer end of the outer shaft member 33 is journaled through a bearing 42 which is carried by the outer end wall 43 of the outer section 20. A collar 44 is fixed on the shaft member 33 for holding this shaft member against outward lengthwise movement.

The inner shaft member 32 is also journaled in an inner bearing 45 disposed at the bottom of the receiver 12, and a sprocket 46 is fixed on the inner shaft member 32 and has a chain or flexible drive member 47 trained thereabout. The gear changer 17 includes a shaft 48 having a sprocket 49 fixed thereon within the receiver, and the chain 47 is trained about the driving sprocket 48.

The inner shaft member 32 has fixed thereon a plurality of staggered conveyor blades 50 which are adapted to move the material lengthwise and outwardly of the inner section 19. The inner section 19 is formed in the bottom thereof with a plurality of discharge openings 51 through which the material is adapted to be discharged. The outer shaft members 33 also have fixed thereon a plurality of staggered combined conveyor and agitator blades 52 which are pitched to move the material outwardly in the outer sections 20.

The bottom of each outer section 20 is also formed with a plurality of discharge openings 53. By providing a conveyor which is formed of spaced and staggered blades, the material is not only conveyed and agitated while it is being conveyed, but in the event an undue quantity of material should be moved outwardly, the conveyor blades will permit accumulation of the material in the outer sections 20.

The housing 18 is adapted to be supported rearwardly of the hopper 10 by means of pairs of upwardly extending angle bars 54 which are fixed to the opposite sides of the inner section 19. The bars 54 are adapted to be secured as by fastening means 55 to the supporting frame 56 beneath the hopper 10. The inner section 19 is also provided with upwardly extending bars 57 for holding the outer sections 20 against lateral movement when these outer sections are swung upwardly, as shown by the arrows in Figure 1, to an inoperative position.

In the use and operation of this invention, the housing 18 is secured by fastening members 55 to the hopper frame or chassis associated with the hopper. The conveyor 11 is operated in the normal manner to move the material from the interior of the hopper rearwardly thereof for discharge into the receiver 12. The combined conveyor and agitator 31 is continuously rotated through the gear means 17. As the material is discharged into the receiver 12, this material will be moved in opposite lateral directions by the conveyor 31. As this material moves about the bottom of the housing 18, the material will be discharged through the openings 51 and 53.

With a spreader or distributor as hereinbefore described, the fertilizer or other material which is being spread on the surface of the ground can be spread in a relatively wide path, and when the spreading operation has been completed, the outer sections 20 may be raised by swinging these sections upwardly, inwardly and downwardly so that the housing 18 will not require a relatively wide roadway for movement of the device over a road. This spreader may be used for fertilizer, sand, salt, cinders, ground rock, or other granular or powdered material.

I do not mean to confine myself to the exact details of construction herein disclosed, but claim all variations falling within the purview of the appended claims.

What I claim is:

1. A lateral distributor for a hopper having a discharge conveyor, comprising a receiver for receiving the material from said conveyor, an elongated housing communicating with said receiver and extending at right angles to said hopper, said housing being open at the top and being formed of an inner section and a pair of outer sections hingedly connected to said inner section, flanged covers for said housing sections, means detachably securing said covers on said sections, a central conveyor shaft journaled in said inner housing section, outer conveyor shafts journaled in said outer housing sections, said housing sections having discharge openings in the bottoms thereof, and upwardly extending supporting bars fixed to said inner housing section for attachment to the hopper or vehicle chassis.

2. A lateral distributor for a hopper having a discharge conveyor, comprising a receiver for receiving the material from said conveyor, an elongated housing communicating with said receiver and extending at right angles to said hopper, said housing being open at the top and being formed of an inner section and a pair of outer sections hingedly connected to said inner section, each of said outer sections being adapted to overlie an adjacent section for superimposed folded positioning thereon, flanged covers for said housing sections, means detachably securing said covers on said sections, a central conveyor shaft journalled in said inner housing section, outer conveyor shafts journalled in said outer housing sections, said housing sections having discharge openings in the bottoms thereof, and upwardly extending supporting members carried by said inner housing section engageable with said outer housing sections for holding said outer sections against lateral movement in the folded position thereof.

GEORGE O. HOFFSTETTER.

REFERENCES CITED

The following references are of record in the file of this patent:

UNITED STATES PATENTS

| Number | Name | Date |
| --- | --- | --- |
| 435,757 | Lehman | Sept. 2, 1890 |
| 534,750 | Kimball | Feb. 26, 1895 |
| 750,463 | Kessler | Jan. 26, 1904 |
| 896,178 | Tuttle | Aug. 18, 1908 |
| 937,172 | Pearson | Oct. 19, 1909 |
| 1,258,515 | Wills | Mar. 5, 1918 |
| 1,623,743 | McGuiness | Apr. 5, 1927 |
| 1,668,516 | Litchfield et al. | May 1, 1928 |
| 1,991,679 | Johnson | Feb. 19, 1935 |
| 2,221,266 | Roach | Nov. 12, 1940 |
| 2,280,234 | Harvey | Apr. 21, 1942 |
| 2,350,107 | Gandrud | May 30, 1944 |
| 2,369,755 | Rosselot | Feb. 20, 1945 |